Patented Oct. 5, 1937

2,095,077

UNITED STATES PATENT OFFICE 2,095,077

ALKYLAMINO DERIVATIVES OF ACID-SUBSTITUTED DYESTUFFS

Ralph B. Payne, Elma, N. Y., assignor to National Aniline & Chemical Company, Inc., New York, N. Y., a corporation of New York No Drawing. Application March 2, 1935, Serial No. 9,016

12 Claims. (Cl. 260—60)

This invention relates to new colors or dyes and to their manufacture and use. It is particularly directed to the preparation of colors or dyes which are insoluble or sparingly soluble in water but which possess good solubility in certain organic solvents, and which are formed from an organic dyestuff containing an acid or acid salt group and from an aliphatic amine having the following general formula:

wherein R and R' each denotes an alkyl radical containing from 5 to 6 carbon atoms inclusive, i. e. amyl or hexyl, and R'' denotes a member of the group consisting of hydrogen and an alkyl radical containing from 5 to 6 carbon atoms inclusive.

In accordance with the present invention a dyestuff containing a substituent of the group consisting of carboxyl and sulfo groups, that is —COOM or —SO₂OM, wherein M represents hydrogen or a metal and which dyestuff accordingly may be represented by the general formula

Ar representing the dyestuff nucleus, Ac denoting a member of the group consisting of —C=O— and —SO₂— and $x$ the number of acid groups, is reacted with a secondary or tertiary amyl and/or hexylamine, or a salt thereof. The secondary and tertiary amylamines yield especially satisfactory products and in the preferred embodiment of the invention at least one of these amines is employed.

The amine salt of the dyestuff, which is assumed to be formed, may be represented in the case of a mono-acid dyestuff, by the following probable general formula:

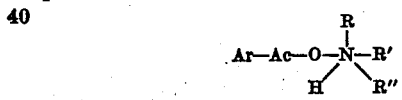

wherein Ar represents the dyestuff nucleus, Ac represents a —CO— or —SO₂— group joined directly to an aromatic carbon of the dyestuff, R and R' each denotes an amyl or hexyl radical, and R'' hydrogen or an amyl or hexyl group. In case the dyestuff contains two or more acid or acid-salt groups, then the resulting amine salt is regarded as containing the same or a corresponding number of said groups each in combination with one amine group and may be represented by the general formula:

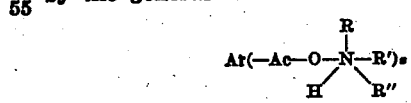

wherein Ar, Ac, R, R', and R'' have the values previously ascribed and $x$ represents an integer equal to the number of acid or acid-salt groups of the parent dyestuff.

Although secondary or tertiary alkyl amines containing alkyl groups having less than 5 and more than 6 carbon atoms may be reacted with dyestuffs containing acid groups, the resultant products are not ordinarily sufficiently soluble in the common organic solvents, such as ethyl alcohol, to constitute products of great commercial value for formation of colored products with such solvents.

The compounds of the present invention are soluble in various alcohols, and other organic solvents, or mixtures of the same, for example, ethyl alcohol, butyl alcohol, benzyl alcohol, cyclohexanol, cyclohexanone, amylacetate, acetone, and mixtures of the same. They are insoluble or only sparingly soluble in water. The solubilities of the individual colors or dyes prepared in accordance with the present invention vary depending upon the particular dyestuff employed. In general the products prepared from the trialkylamines possess greater solubility in alcohol or an alcoholic solvent than those prepared from the dialkylamines. In some instances the solubilities of the products in alcohol are somewhat greater when prepared from a mixture of trialkyl- and/or dialkyl-amines.

In view of their high solubility in alcohol and in other organic solvents, and their insolubility or limited solubility in water, the compounds of the present invention are especially applicable for the preparation of films, masses, threads, or dyed surfaces subjected to exposure to water or aqueous solutions. For example, they may be used to impart color to fibers, threads, filaments, or films, such as cellulose esters or ethers, for example the acetates or nitrates, or to solutions containing such compositions; they may be dissolved in the solvents of lacquers or varnishes, to impart color to films prepared therefrom and when so employed will impart a transparent tint or color to the film. The products are likewise suitable for application as wood stains and may be applied for this purpose in alcoholic solution, or for the coloring of paper, or they may be mixed with the usual substrata or with varnish or with linseed oil or with other vehicles with or without pigments and applied in the methods applicable to varnishes. Similarly they may be used for the preparation of variously colored shellacs.

The invention is applicable to preparation of water-insoluble or sparingly soluble dyes from organic dyestuffs generally, containing of course the requisite acid groups; for example the products may be prepared from mono- and poly-azo, nitroso, triphenylmethane, anthraquinone, hydroxy-pyrazole dyes, etc.

The following examples serve to illustrate the invention, it being understood that they are not limitative. Quantities are expressed as parts by weight.

Example 1.—200 parts by weight of Buffalo Black NBR ("Colour Index" No. 246) are dissolved in 4000 parts of water. The solution is stirred well and there is added a solution or suspension of 120 parts of triamylamine in 200 parts 20° Bé. (32%) hydrochloric acid and about 2000 parts of water. The resultant mixture is heated at boiling temperature with agitation for about 30 minutes. A black, tarry product is thereby precipitated. This product is separated, washed with water, and dried. When dry, it is a black powder soluble in alcohol forming a blue-black solution, insoluble in benzene, insoluble in amylacetate, soluble in acetone forming a dark blue solution, soluble in concentrated hydrochloric acid forming a reddish brown solution, and soluble in concentrated sulfuric acid forming a green solution which on dilution gives a blue precipitate and a blue solution.

In a similar manner, if Wool Orange A (New Schultz No. 181; "Colour Index" No. 151) is combined with triamylamine in place of Buffalo Black NBR, a product is obtained which in the dry state is a bright orange powder of good solubility in ethyl alcohol giving an orange solution. It is also soluble in methyl alcohol, diethylene-glycol, benzyl alcohol, and cyclohexanone, fairly soluble in acetone and in cyclohexanol, less soluble in amyl acetate and in benzene, and sparingly soluble in glycerine and in water. Dissolved in concentrated sulfuric acid it gives a reddish violet solution.

If Croceine Scarlet MOO (New Schultz No. 539; "Colour Index" No. 252) be employed, a dark brick-red powder is obtained which is soluble in ethyl alcohol giving a red solution. It is also soluble in methyl alcohol, carbitol (monoethylether of diethylene glycol), benzyl alcohol, and cyclohexanone, less so in amyl acetate, benzene, acetone, and cyclohexanol, sparingly soluble in amyl acetate and in benzene, and insoluble in water. In sulfuric acid it dissolves to form a reddish violet solution.

If a mixture of 80 parts Solantine Blue FF (trisazo dye containing Cassella acid, alpha-naphthylamine; 1,7-Cleve's acid, and 2-amino-5-naphthol-7-sulfonic acid) and 120 parts Solantine Blue 4GL (trisazo dye containing aniline-3,6-disulfonic acid, 1-amino-naphthalene-7-sulfonic acid, alpha-naphthylamine and 2-phenylamino-5-naphthol-7-sulfonic acid), be employed, a dark, blackish powder is obtained which is soluble in ethyl alcohol giving a blue solution. It is fairly soluble in methyl, butyl, and benzyl alcohols, less so in acetone, cyclohexanol, diethylene glycol, and glycerine, and insoluble in benzene and in water. It dissolves in concentrated sulfuric acid giving a blue solution.

Example 2.—400 parts of Fast Wool Yellow 3GL (diazotized aniline coupled with 1-(2'-chlor-5'-sulfo-phenyl)-3-methyl-5-pyrazolone) are dissolved in 8000 parts of water. The solution is stirred and to it there is added a solution or suspension of 200 parts of diamylamine in 300 parts of hydrochloric acid of 20° Bé. and about 16,000 parts of water. The resultant mixture is boiled, with agitation, for about 30 minutes. A yellow product is thereby precipitated, and this product is separated, washed with water, and dried. When dry, it is a yellow powder soluble in ethyl alcohol forming a yellow solution, soluble in methyl alcohol, benzyl alcohol, and cyclohexanone, practically insoluble in benzene, water, and amylacetate, poorly soluble in cyclohexanol, diethylene-glycol, and glycerine. Dissolved in sulfuric acid, it gives a canary yellow solution.

Example 3.—400 parts of Solantine Brown R (diazotized sulfanilic acid coupled with alpha-naphthylamine and the product condensed with dinitro-stilbene-disulfonic acid) are dissolved in 4800 parts of water. The solution is stirred well and to it there is added a solution or suspension of 80 parts of diamylamine in 120 parts of hydrochloric acid (20° Bé.), and about 8000 parts of water. The resultant mixture is heated at boiling with agitation for about 30 minutes. Then there is added another solution or suspension of 80 parts of triamylamine, in 120 parts of hydrochloric acid (20° Bé.) and about 8000 parts of water, and the mixture is boiled an additional thirty minutes. A dark brown, tarry product is precipitated. This product is separated, washed and dried. When dry, it is a dark brown powder, soluble in ethyl alcohol forming a strong brown solution, soluble in methyl alcohol, benzyl alcohol, and cyclohexanone, insoluble in benzene and in water, poorly soluble in diethylene-glycol, cyclohexanol, and glycerine. Dissolved in sulfuric acid it gives a blue solution.

In a similar manner, if Naphthol Green B (New Schultz No. 5; "Colour Index" No. 5) is combined with a mixture of di- and tri-amylamines, a product is obtained which is a dark greenish powder soluble in ethyl alcohol to a green solution, soluble in methyl alcohol, carbitol, benzyl alcohol, butyl alcohol, acetone, and cyclohexanone, less so in cyclohexanol, glycerine, and diethylene-glycol, insoluble in benzene and in water. It dissolves in sulfuric acid to give a reddish-yellow solution.

In a similar manner, dyestuffs of various classes may be used to prepare the coloring matters of the present invention provided they contain one or more acid salt-forming groups, as for instance Wool Violet 4BN ("Colour Index" No. 698), Alizarine Cyanine Green G extra (New Schultz No. 1201; "Colour Index" No. 1078), Acid Violet 4BL (tetramethyl-diamino-diphenyl-carbinol condensed with a dibenzylaniline-disulfonate, and the resulting product oxidized), Fast Light Yellow 2G (New Schultz No. 736; "Colour Index" No. 636), and many others.

In effecting the combination of amine with the dyestuff, it is preferable to employ the dyestuff in the form of a soluble salt, for example a sodium salt, and to employ an amount of acid theoretically sufficient to form with the amine an amine acid salt, or to employ the salt of the amine; any suitable acid may be employed or any corresponding amine salt, for example hydrochloric acid, acetic acid, or sulfuric acid, or the amine salts from such acids. It is preferable to use either the hydrochloric acid or acetic acid rather than sulfuric acid, however, as when these acids are employed the final product may be more easily isolated and dried. The amyl and/or hexyl groups of the amine may be either straight or branched open hydrocarbon chains. In general the branched chain amines give products somewhat superior to the straight chain amines.

I claim:
1. A process for the preparation of dyestuffs, which comprises reacting an organic dyestuff containing a substituent of the group consisting of carboxyl and sulfo groups with an amine having the general formula

wherein R and R' each represents an alkyl radical containing from 5 to 6 carbon atoms inclusive and R'' represents a member of the group consisting of hydrogen and an alkyl radical containing from 5 to 6 carbon atoms inclusive.

2. A process for the manufacture of dyestuffs, which comprises reacting a salt of an amine having the general formula

wherein R and R' each represents an alkyl group containing from 5 to 6 carbon atoms inclusive, and R'' denotes a member of the group consisting of hydrogen and an alkyl group containing from 5 to 6 carbon atoms inclusive, with a water-soluble metal salt of an organic dyestuff containing an acid salt-forming group, which forms with the amine a compound insoluble or sparingly soluble in water but soluble in an alcohol.

3. A process for the preparation of a substantially water-insoluble dyestuff, which comprises reacting a dye of the group consisting of Buffalo Black NBR, Wool Orange A, Croceine Scarlet MOO, Solantine Blue FF, Fast Wool Yellow 3GL, Solantine Brown R, Solantine Blue 4GL, Naphthol Green B, Wool Violet 4BN, Alizarin Cyanine Green G extra, Acid Violet 4BL, and Fast Light Yellow 2G, with a compound of the group consisting of amines and acid salts of amines, having the general formula

wherein R and R' each represents an amyl radical and R'' represents a member of the group consisting of hydrogen and an amyl radical.

4. A process for the preparation of a substantially water-insoluble dyestuff, which comprises reacting a dye of the group consisting of Buffalo Black NBR, Wool Orange A, Croceine Scarlet MOO, Solantine Blue FF, Fast Wool Yellow 3GL, Solantine Brown R, Solantine Blue 4GL, Naphthol Green B, Wool Violet 4BN, Alizarin Cyanine Green G extra, Acid Violet 4BL, and Fast Light Yellow 2G with triamylamine.

5. A process for the preparation of dyestuffs, which comprises reacting an organic dyestuff containing a sulfo group with triamylamine.

6. A process for the manufacture of dyestuffs, which comprises reacting a salt of triamylamine with a water-soluble metal salt of an organic dyestuff containing a sulfo group, which forms with the amine a compound insoluble or sparingly soluble in water but soluble in an alcohol.

7. A new dyestuff comprising the reaction product of a dye of the group consisting of Buffalo Black NBR, Wool Orange A, Croceine Scarlet MOO, Solantine Blue FF, Fast Wool Yellow 3GL, Solantine Brown R, Solantine Blue 4GL, Naphthol Green B, Wool Violet 4BN, Alizarin Cyanine Green G extra, Acid Violet 4BL, and Fast Light Yellow 2G with a compound of the group consisting of amines and acid salts of amines, having the general formula

wherein R and R' each represents an amyl radical and R'' represents a member of the group consisting of hydrogen and an amyl radical.

8. A new dyestuff comprising the reaction product of a dye of the group consisting of Buffalo Black NBR, Wool Orange A, Croceine Scarlet MOO, Solantine Blue FF, Fast Wool Yellow 3GL, Solantine Brown R, Solantine Blue 4GL, Naphthol Green B, Wool Violet 4BN, Alizarin Cyanine Green G extra, Acid Violet 4BL, and Fast Light Yellow 2G with triamylamine.

9. A new dye compound having the following general formula

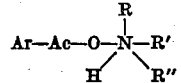

wherein Ar represents the acid free radical of an acid-substituted organic dyestuff, Ac represents a member of the group consisting of CO and $SO_2$, R and R' each represents an alkyl radical containing from 5 to 6 carbon atoms inclusive, and R'' represents a member of the group consisting of hydrogen and an alkyl radical containing from 5 to 6 carbon atoms inclusive.

10. A new dyestuff comprising the reaction product of an amine having the general formula

wherein R and R' each represents an alkyl radical containing from 5 to 6 carbon atoms inclusive and R'' denotes a member of the group consisting of hydrogen and an alkyl radical containing from 5 to 6 carbon atoms inclusive with a water-soluble metal salt of an organic dyestuff containing an acid salt-forming group, which forms with the amine a compound insoluble or sparingly soluble in water but soluble in an alcohol.

11. A new dyestuff comprising the reaction product of triamylamine with a water-soluble metal salt of an organic dyestuff containing a sulfo group, which forms with the amine a compound insoluble or sparingly soluble in water but soluble in an alcohol.

12. A new dyestuff having the following general formula

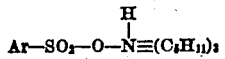

wherein Ar represents the acid free radical of an acid-substituted organic dyestuff.

RALPH B. PAYNE.